United States Patent
Haidar et al.

(10) Patent No.: US 11,609,877 B1
(45) Date of Patent: Mar. 21, 2023

(54) SYSTEMS AND METHODS FOR CHIP OPERATION USING SERIAL PERIPHERAL INTERFACE (SPI) WITHOUT A CHIP SELECT PIN

(71) Applicant: QUALCOMM Incorporated, San Diego, CA (US)

(72) Inventors: Kishalay Haidar, Bangalore (IN); Amit Gil, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/484,419

(22) Filed: Sep. 24, 2021

(51) Int. Cl.
*G06F 13/42* (2006.01)
*G06F 1/04* (2006.01)

(52) U.S. Cl.
CPC .......... *G06F 13/4291* (2013.01); *G06F 1/04* (2013.01)

(58) Field of Classification Search
CPC ............................. G06F 1/04; G06F 13/4291
See application file for complete search history.

(56) References Cited

U.S. PATENT DOCUMENTS

| | | | |
|---|---|---|---|
| 11,216,049 B2 * | 1/2022 | Huang | G06F 13/20 |
| 2006/0143348 A1 * | 6/2006 | Wilson | G06F 13/4291 |
| | | | 710/110 |
| 2018/0267916 A1 * | 9/2018 | Mishra | G06F 13/4282 |

FOREIGN PATENT DOCUMENTS

CN 107832249 B * 7/2020 ......... G06F 13/4291

OTHER PUBLICATIONS

EPO machine translation of CN-107832249-B (Year: 2020).*
Author Unknown, "Synchronizer Techniques for Multi-Clock Domain SoCs & FPGAs," EDN, Sep. 30, 2014, https://www.edn.com/synchronizer-techniques-for-multi-clock-domain-socs-fpgas/, 5 pages.
Author Unknown, "I2C," Wikipedia, Aug. 29, 2021, Retrieved from the Internet: [URL: https://en.wikipedia.org/w/index.php?titl.e=I2C &ol.did=I041225254], 15 pages.
Author Unknown, "Serial Peripheral Interface," Wikipedia, Aug. 28, 2021, Retrieved from the Internet: [URL: URL:https://en.wikipedia.org/w/index.php?title=Serial_Peripheral_Interface&oldid= 1041163070,], 18 pages.
International Search Report and Written Opinion for International Patent Application No. PCT/US2022/075561, dated Nov. 25, 2022, 12 pages.

* cited by examiner

*Primary Examiner* — Glenn A. Auve
(74) *Attorney, Agent, or Firm* — Holland & Hart LLP/Qualcomm (57) ABSTRACT

Systems and methods for chip operation using serial peripheral interface (SPI) without a chip select pin are disclosed. A communication link between a host and a device may include a clock line, a host to device line, and a device to host line. The host may signal a start or stop condition using the clock line and the device may send an acknowledgment of the host's signaling through the device to host line. Once acknowledgment is made, the host may then signal on the host to device line using a protocol such as SPI.

24 Claims, 10 Drawing Sheets

SYSTEMS AND METHODS FOR CHIP OPERATION USING SERIAL PERIPHERAL INTERFACE (SPI) WITHOUT A CHIP SELECT PIN

BACKGROUND

I. Field of the Disclosure

The technology of the disclosure relates generally to communication between two integrated circuits (ICs) that operate using the serial peripheral interface (SPI) specification.

II. Background

Computing devices abound in modern society, and more particularly, mobile communication devices have become increasingly common. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences.

In many instances, the functions may be enabled by having circuits on different dies or chips communicate with one another. For example, a processor chip may communicate with a memory chip or a sensor chip. Various standards and protocols have been developed to assist in such communication. One popular standard for low-speed communication is the serial peripheral interface (SPI) specification. SPI is widely adopted. Accordingly, improvements to SPI may provide disproportionate impact across a computing device.

SUMMARY

Aspects disclosed in the detailed description include systems and methods for chip operation using serial peripheral interface (SPI) without a chip select pin. In particular, exemplary aspects contemplate eliminating the chip select pin for host (also referred to as master)-to-single device (also referred to as slave) communication links. The communication link may include a clock line, a host-to-device line, and a device-to-host line. The host may signal a start or stop condition using the clock line, and the device may send an acknowledgment of the host's signaling through the device-to-host line. Once acknowledgment is made, the host may then signal on the host-to-device line using a protocol such as SPI. Such arrangement obviates the need for a dedicated chip select pin, which may save space on the chip and help reduce the complexity of line routing between chips.

In this regard in one aspect, an integrated circuit (IC) is disclosed. The IC includes a bus interface. The bus interface includes a clock pin configured to couple to a clock line on an associated bus. The bus interface also includes an input pin configured to couple to an input line on the associated bus. The bus interface also includes an output pin configured to couple to an output line on the associated bus. The IC also includes a control circuit. The control circuit is configured to detect a change on the clock pin. The control circuit is also configured to send an acknowledgment (ACK) on the output pin that the change was detected. The control circuit is also configured to, after sending the ACK, detect a subsequent change on the clock pin. The control circuit is also configured to send a second ACK on the output pin.

In another aspect, an IC is disclosed. The IC includes a bus interface. The bus interface includes a clock pin configured to couple to a clock line on an associated bus. The bus interface also includes an input pin configured to couple to an input line on the associated bus. The bus interface also includes an output pin configured to couple to an output line on the associated bus. The IC also includes a control circuit. The control circuit is configured to hold a clock signal on the clock pin at a logical high. The control circuit is also configured to change the clock signal to a logical low. The control circuit is also configured to receive an ACK on the input pin that the change was detected. The control circuit is also configured to, after receiving the ACK, change the clock signal to the logical high. The control circuit is also configured to receive a second ACK on the input pin.

In another aspect, a method for controlling an SPI bus is disclosed. The method includes detecting a change on a clock pin. The method also includes sending an ACK on an output pin that the change was detected. The method also includes, after sending the ACK, detecting a subsequent change on the clock pin. The method also includes sending a second ACK on the output pin.

In another aspect, a method for controlling an SPI bus is disclosed. The method includes holding a clock signal on a clock pin at a logical high. The method also includes changing the clock signal to a logical low. The method also includes receiving an ACK on an input pin that the change was detected. The method also includes, after receiving the ACK, changing the clock signal to the logical high. The method also includes receiving a second ACK on the input pin.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for chip operation using serial peripheral interface (SPI) without a chip select pin. In particular, exemplary aspects, contemplate eliminating the chip select pin for host (also referred to as master)-to-single device (also referred to as slave) communication links. The communication link may include a clock line, a host-to-device line, and a device-to-host line. The host may signal a start or stop condition using the clock line and the device may send an acknowledgment of the host's signaling through the device-to-host line. Once acknowledgment is made, the host may then signal on the host-to-device line using a protocol such as SPI. Such arrangement obviates the need for a dedicated chip select pin, which may save space on the chip and help reduce the complexity of line routing between chips.

Figure 1A:
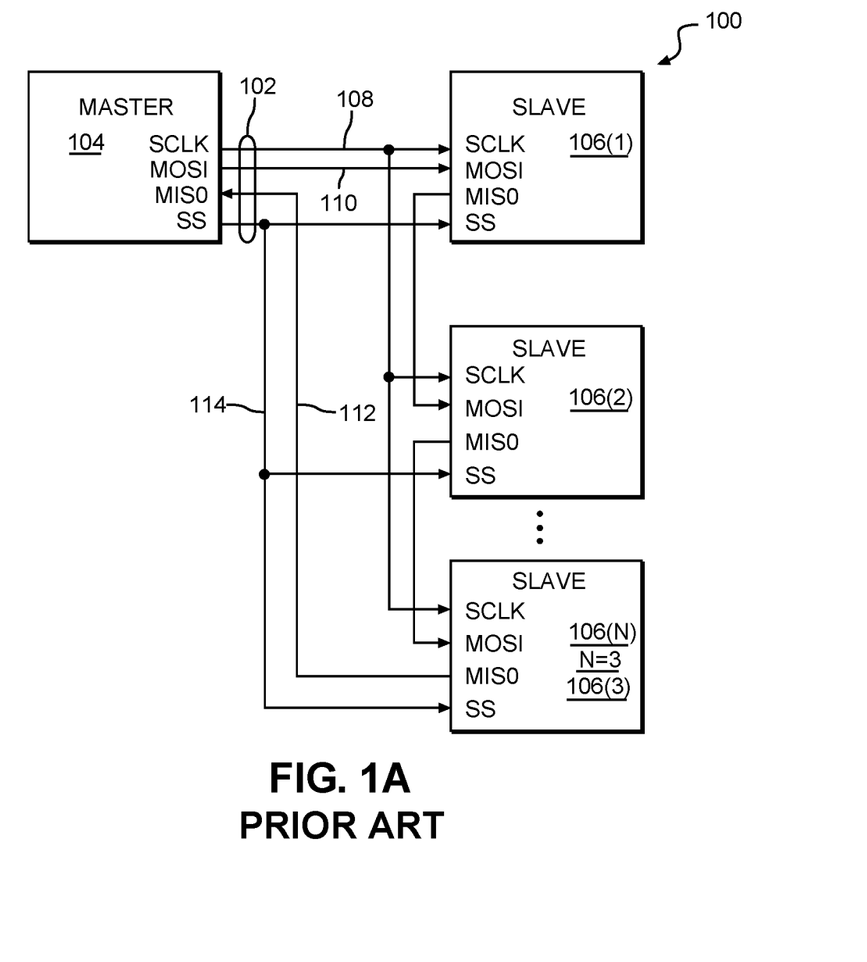
FIG. 1A is a block diagram of a conventional chip-to-multiple chip system that uses a daisy-chain serial peripheral interface (SPI) link to communicate.
Figure 1B:
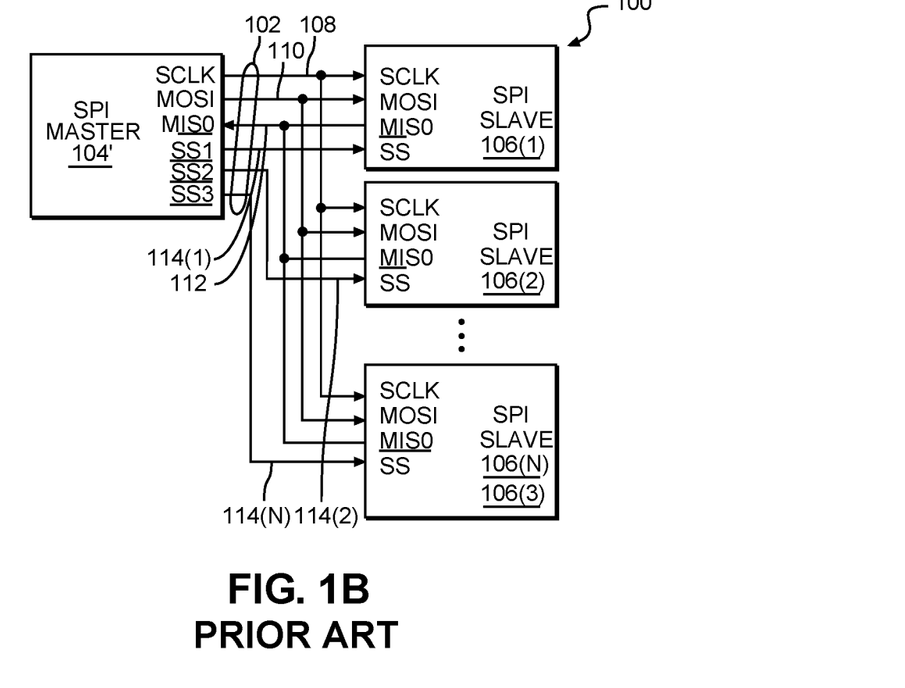
FIG. 1B is a block diagram of a conventional chip-to-multiple chip system that uses independently-arranged devices on an SPI link to communicate.
Figure 1C:
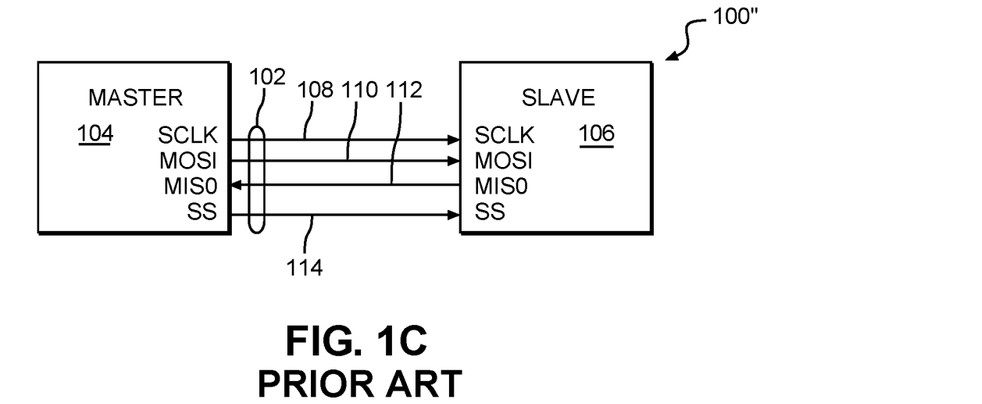
FIG. 1C is a block diagram of a conventional chip-to-chip system that uses an SPI link to communicate.
Figure 2:
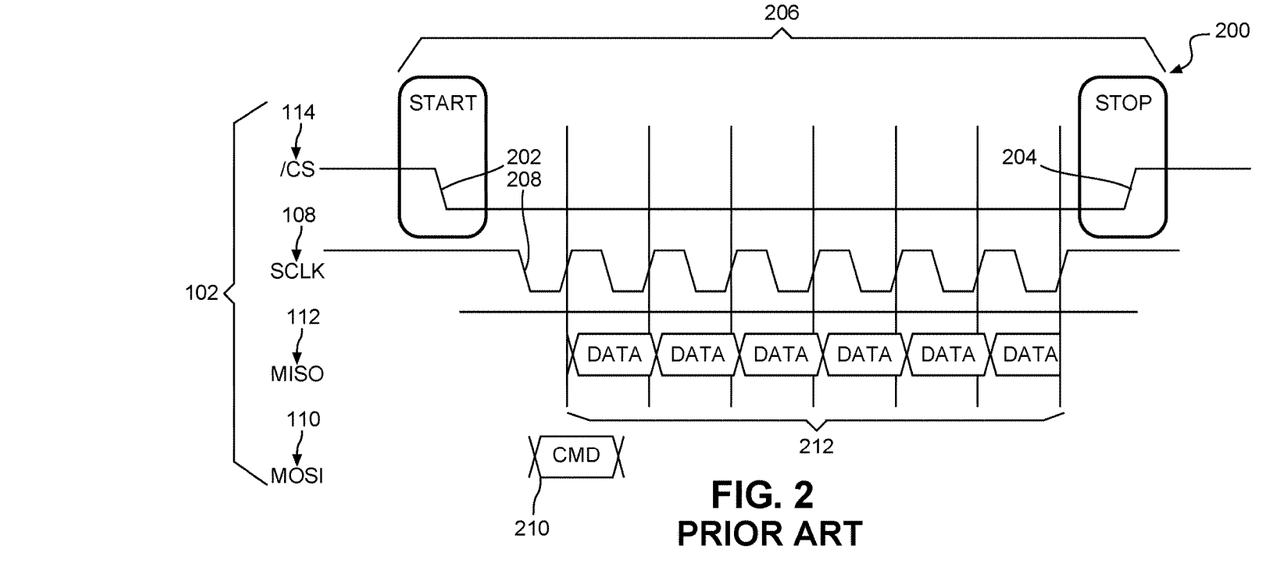
FIG. 2 is a signaling diagram showing how lines within an SPI link may be used in a conventional SPI link.

Before addressing exemplary aspects of the present disclosure, a brief overview of a chip-to-multiple chip system that uses an SPI link is provided in FIGS. 1A and 1B, and a chip-to-chip system that uses an SPI link is provided in FIG. 1C to provide context for the subsequent discussion. FIG. 2 provides a signaling diagram for a conventional SPI link and a discussion of exemplary aspects of the present disclosure begins below with reference to FIG. 3.

In this regard, FIG. 1A is a block diagram of a conventional chip-to-multiple chip system 100 that uses an SPI link 102 to communicate between chips. As used herein, a chip is an integrated circuit (IC) or monolithic IC that has a set of electronic circuits on one small piece of semiconductor material such as silicon. It should be appreciated that a plurality of chips may be stacked to form a system in a package (SiP) that may be a number of ICs enclosed in one or more chip carrier packages that may be stacked using package-on-package. The SiP performs all or most of the functions of an electronic system, and is typically used inside a mobile phone, digital music player, etc. Dies containing ICs may be stacked vertically on a substrate. The dies are internally connected by fine wires that are bonded to the package. Alternatively, with a flip chip technology, solder bumps are used to join stacked chips together. A SiP is like a system on a chip (SoC) but less tightly integrated and not on a single semiconductor die.

With continued reference to FIG. 1A a first chip 104 may be a host IC. Historically, a host IC might be referred to as a master IC and such terminology may be used interchangeably herein. The first chip 104 is coupled through the SPI link 102 to a plurality of second chips 106(1)-106(N), where as illustrated, N=3. The second chips 106(1)-106(3) may be referred to as device chips or slave chips. The SPI link 102 includes a clock line (SCLK) 108, a master out, slave in (MOSI) line 110, a master in, slave out (MISO) line 112, and a slave select (SS) line 114. The slave select line 114 is also commonly referred to as a chip select (CS) line. In FIG. 1A, the second chips 106(1)-106(3) are arranged in a daisy chain, where the MISO of the second chip 106(1) connects to the MOSI of the second chip 106(2). The MISO of the second chip 106(2) connects to the MOSI of the second chip 106(3), and the MISO of the second chip 106(3) connects to the MISO of the first chip 104.

In contrast, the second chips may be independently arranged as better illustrated by the chip-to-multiple chip system 100' illustrated in FIG. 1B. The second chips 106 (1)-106(N) are the same, but the SPI link 102' has additional slave select lines 114(1)-114(N) that individually couple the first chip 104' to the second chips 106(1)-106(N). Likewise, instead of daisy chaining the second chips 106(1)-106(N), the MOSI line 110 couples the first chip 104' to each of the second chips 106(1)-106(N), and the MISO line 112 likewise couples each of the second chips 106(1)-106(N) to the first chip 104'.

While the chip-to-multiple chip systems 100 and 100' are defined and used in some instances within a computing device, more commonly SPI may be used to connect just a single pair of chips as better illustrated by system 100" in FIG. 1C. The system 100" includes a first chip 104 and just a single second chip 106. The SPI link 102 contains the lines 108, 110, 112, and 114 previously discussed, but has no need for daisy chaining or extra chip select lines.

FIG. 2 illustrates a signal diagram 200 for a typical SPI link 102. Apart from designating which second chip 106(1)-106(N) is being enabled or selected, the CS line 114 also indicates a valid transaction phase by asserting a logical low during the active transaction. The falling edge 202 indicates a start of transaction and a rising edge 204 indicates an end of transaction. During the valid transaction window 206, the clock line 108 provides a clock signal 208. Outside the valid transaction window 206, the clock line 108 is held at a logical high. The first chip 104 may send a command 210 on the MOSI line 110 in the valid transaction window 206, which causes the second chip 106 to send responsive data 212 on the MISO line 112.

It should be appreciated that SPI is a low-speed (typically below 50 megahertz (MHz) and more commonly below 10 MHz with throughput ranges around 10 megabits per second (Mbps) to 50 Mbps), synchronous serial communication interface specification used for short-distance communication, primarily in embedded systems. Thus, while exemplary aspects of the present disclosure focus on SPI as an exemplary aspect, the present disclosure is not so limited. Other synchronous serial communication systems that employ full duplex communication and include a slave or chip select lines may also benefit from the present disclosure.

The SPI specification has proven useful since its introduction in the mid-1980s. However, more modern computing devices may have a central application processor or modem that has numerous associated sensor chips or affiliated chips which are not amenable to daisy chain or independent control on a multiple slave bus. Thus, each of these sensor or affiliated chips may have its own SPI link with the corresponding four lanes or lines therewithin. Each line requires its own pin or bump on each of the chips, which adds to the cost and complexity of both chips. Likewise, routing many lines between an application and a plurality of affiliated chips can be challenging.

Exemplary aspects of the present disclosure allow the elimination of the chip select line and the corresponding chip select pin from both ends of an SPI link. Where a chip, such as a SoC or other chip, has multiple SPI master circuits, elimination of the chip select line and pin allows for multiplicative space and cost savings. Exemplary aspects of the present disclosure not only eliminate the chip select lines and pins, but also preserve the valid transaction indication function of the chip select line by introducing a signaling sequence between the host and the device using the remaining lines. In particular, the host signals the start of a new transaction by manipulating the clock line of the SPI link and receiving an acknowledgment from the device of the MISO line. Similarly, the end of a transaction is signaled by the host using the clock line and an acknowledgment is received on the MISO line.

Figure 3:
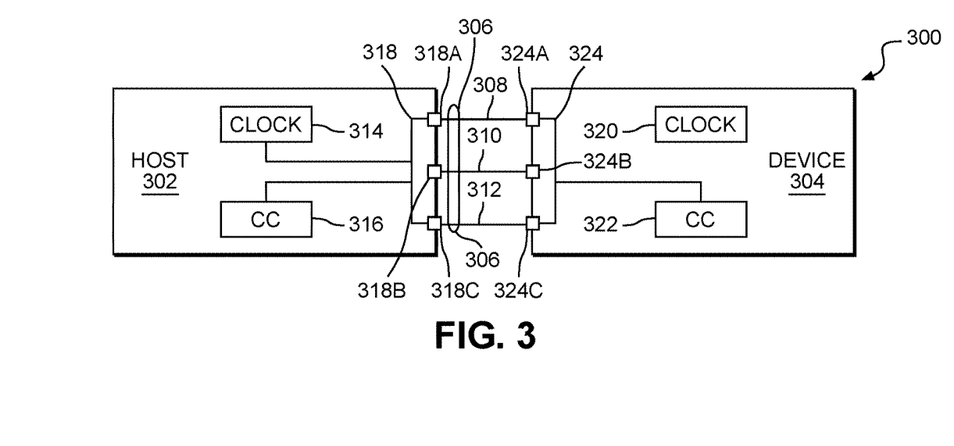
FIG. 3 is a block diagram of an exemplary chip-to-chip system that uses an SPI link without a chip select line according to exemplary aspects of the present disclosure.

An exemplary system 300 is illustrated in FIG. 3. The system 300 includes a host (or master) chip 302 coupled to a device (or slave) chip 304 by a modified SPI link 306. The modified SPI link 306 has a clock (SCLK) line 308, a MISO line 310, and a MOSI line 312, but does not have a slave or chip select line. The host chip 302 may include a clock 314 and a control circuit 316 as well as a bus interface 318 (sometimes referred to as a host bus interface). Similarly, the device chip 304 may include an internal clock 320 and a control circuit 322 as well as a bus interface 324 (sometimes referred to as a device bus interface to differentiate it from the host bus interface). It should be appreciated that the bus interfaces 318, 324 may include pins or bumps (although as used herein, the term "pin" is defined to include bumps). In particular, the host bus interface 318 may include a clock pin 318A, an input pin 318B (corresponding to the MISO line 310), and an output pin 318C (corresponding to the MOSI line 312). Similarly, the device bus interface 324 may include a clock pin 324A, an output pin 324B (corresponding to the MISO line 310), and an input pin 324C (corresponding to the MOSI line 312).

In an exemplary aspect, the host chip 302 and the device chip 304 may initially be connected and perform a handshake-based two-way synchronization. Handshake synchronization is well understood in the art, but may be summarized as a request and acknowledgement mechanism to guarantee a sampling of correct data into a destination clock domain irrespective of clock ratio between the source (e.g., the host chip 302 and clock 314) and the destination clock (e.g., the device chip 304 and internal clock 320). There may be other ways to synchronize the host chip 302 and the device chip 304, and such are within the scope of the present disclosure.

Relevant to the synchronization process is that the device chip 304, and particularly the control circuit 322, may understand the ratio between the clocks 314, 320 and know or determine that sampling across N (i.e., some predetermined value) clock cycles of the internal clock 320 is required to reliably detect a change in state in the clock signal at the clock pin 324A and confirm that the change in state is being maintained. This ability is relevant for a transaction start sequence as explained in greater detail below with reference to FIG. 4.

Figure 4:
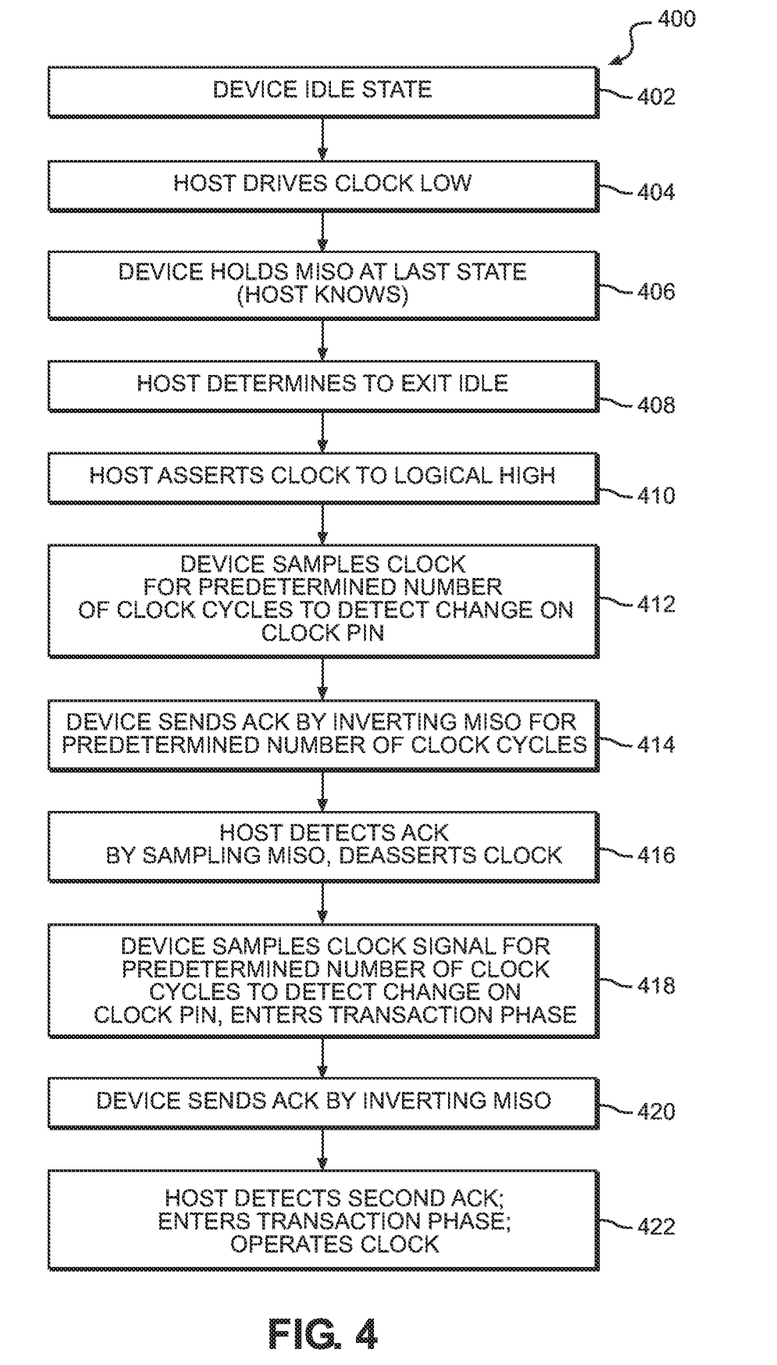
FIG. 4 is a flowchart illustrating a start condition sequence for the chip-to-chip system of FIG. 3.

In this regard, FIG. 4 illustrates a transaction start sequence process 400 that includes a few preliminary steps including the system 300 entering an idle state (block 402) and the host chip 302 driving the clock signal on the clock line 308 to a logical low (block 404). The device chip 304 holds the MISO line 310 at a last state known to the host chip 302 (block 406). Note that in an initial start up, the host chip 302 knows that the MISO line 310 starts at a logical low, so even if this particular idle state has no preceding active state, the host chip 302 may still know the expected state of the MISO line 310.

With continued reference to FIG. 4, the host chip 302 determines to exit the idle state (block 408). The exit from the idle state may be caused by a need to sample a sensor, a need to access data within the device chip 304, or the like. The host chip 302 asserts the clock signal on the clock line 308 to a logical high (block 410). The device chip 304 samples the clock signal at the clock pin 324A for a predetermined number of clock cycles of the internal clock 320 to detect and confirm the change on the clock pin 324A (block 412). Note that this predetermined number may be programmable and may be a function of the ratios of the clock frequencies of the clocks 314, 320 and may be set during the handshake synchronization process. The device chip 304 sends an acknowledgment (ACK) by inverting the MISO line 310 for a predetermined number of clock cycles (of the internal clock 320) (block 414). The host chip 302 detects the ACK by sampling the MISO line 310 and deasserts the clock signal (block 416).

With continued reference to FIG. 4, the device chip 304 samples the clock signal for a predetermined number of clock cycles of the internal clock 320 to detect and confirm the change on the clock pin 324A. The device chip 304 enters the transaction phase (block 418) and sends a second ACK by inverting the MISO line 310 (block 420). The host chip 302 detects the second ACK and enters the transaction phase with corresponding operation of the clock signal on the clock line 308 (block 422).

By using a transaction start sequence such as that shown in process 400, the transaction start function of the now missing chip select pin may be preserved. Thus, even though the chip select pin is omitted, the device chip 304 may be instructed to enter the transaction state.

Figure 5:
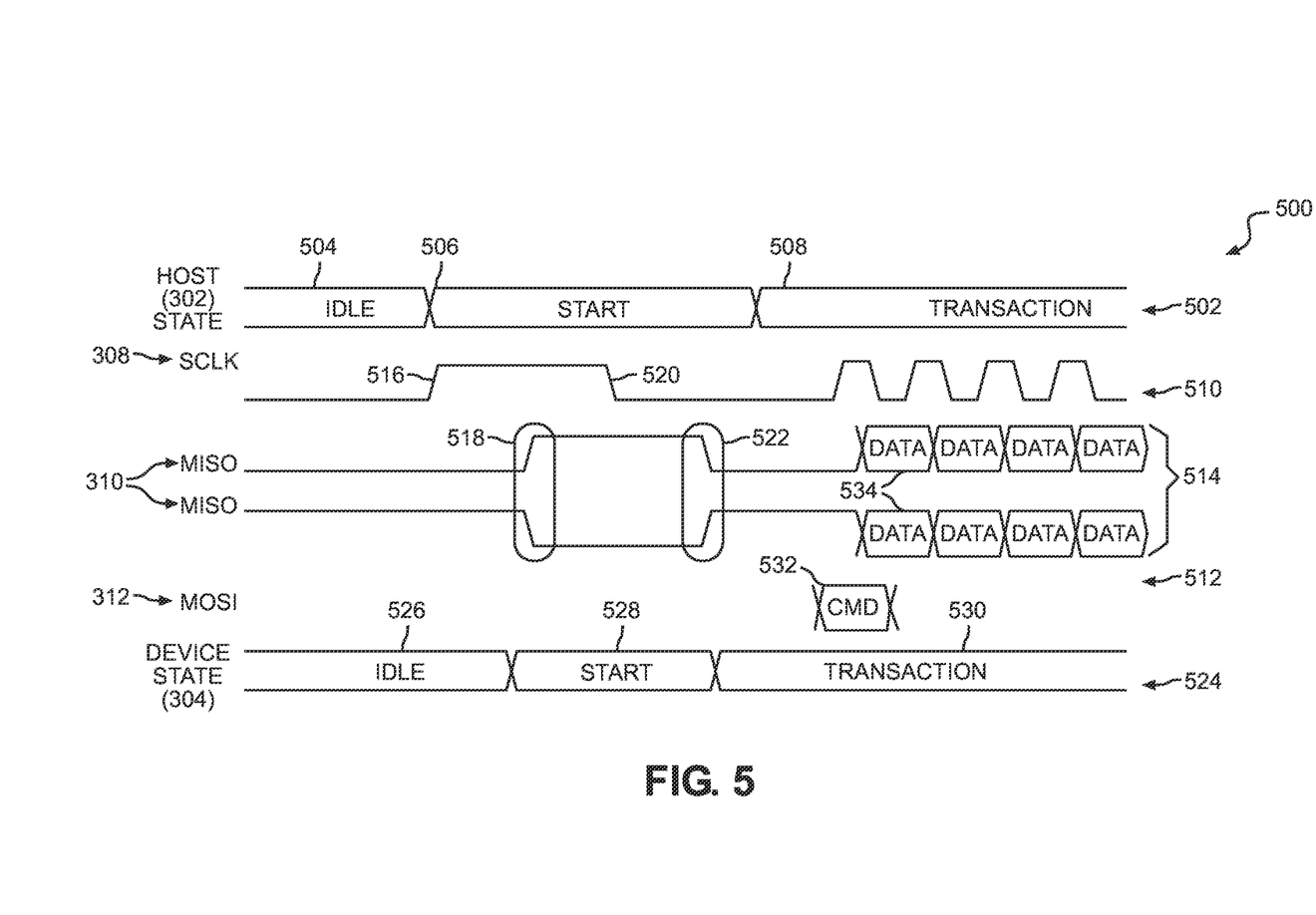
FIG. 5 is a signaling diagram showing the start condition sequence of FIG. 4.

The process 400 corresponds to a signaling diagram 500 illustrated in FIG. 5. A first line 502 corresponds to a state of the host chip 302, where the host chip 302 starts in an idle state 504, enters a start state 506 and then enters a transaction state 508. The host chip 302 controls the clock line 308 shown at line 510 and the MOSI line 312 shown at line 512 while the device chip 304 controls the MISO line 310 shown at line 514. The device chip 304 sees the host chip 302 assert the clock signal on the clock line 308 at time 516 (corresponding to block 410). While the clock is asserted, the device chip 304 is sampling the clock signal to detect and confirm the assertion. The device chip 304 then inverts the MISO line 310 (both from low to high and high to low shown) at time 518 to provide the first ACK (corresponding to block 414). The host chip 302 detects this first ACK and deasserts the clock line at time 520 (corresponding to block 416). The device chip 304 detects and confirms this change of state in the clock line and sends the second ACK at time 522 by inverting the MISO line 310 (corresponding to block 420). As shown in line 524 which has the state of the device chip 304, the device chip 304 starts in an idle state 526, and enters a start state 528 at time 518 by sending the first ACK. The start state 528 ends at time 522 by sending the second ACK, and the device chip 304 enters a transaction state 530. In the transaction state 530, the host chip 302 may send a command 532 on the MOSI line 312, which causes the device chip 304 to sends data 534 on the MISO line 310.

Figure 6:
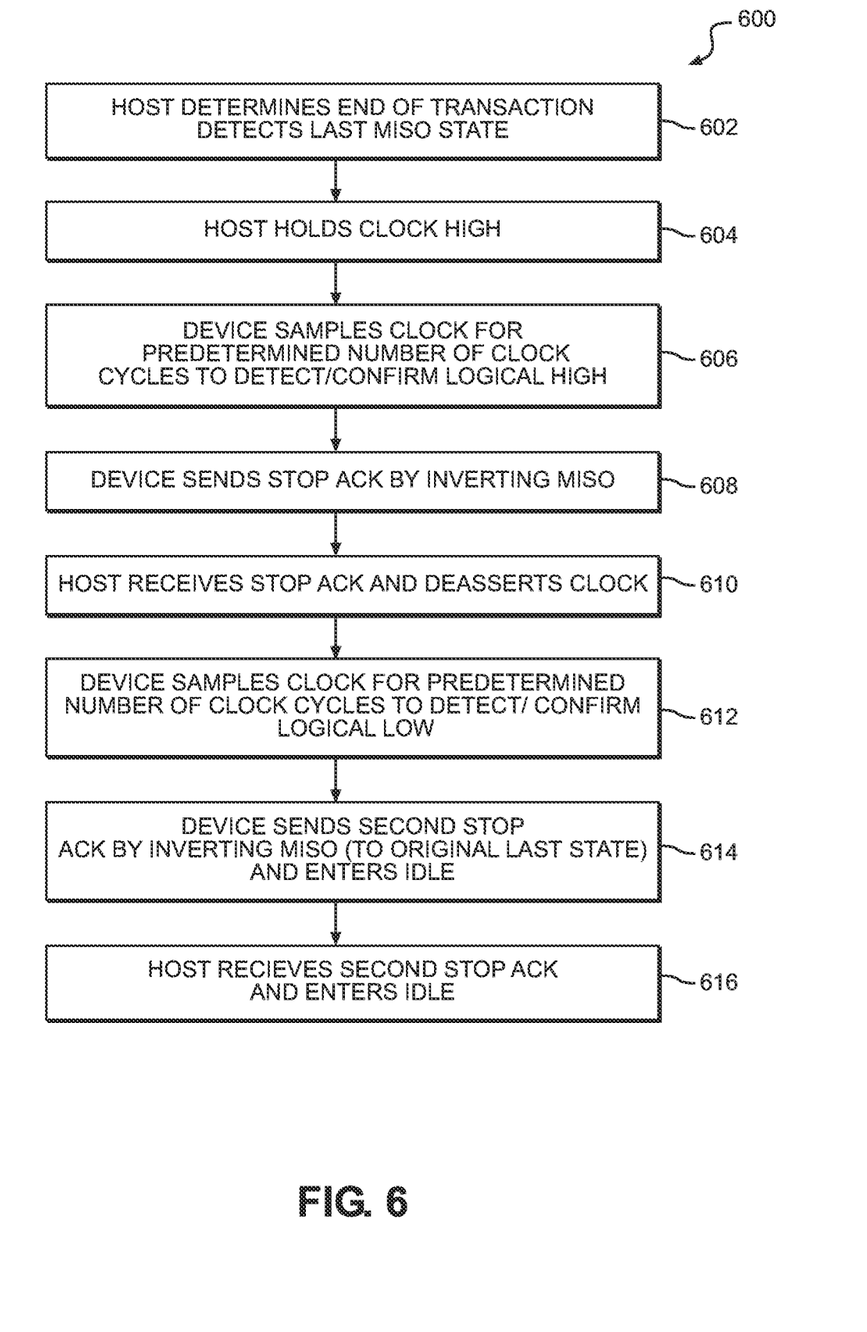
FIG. 6 is a flowchart illustrating a stop condition sequence for the chip-to-chip system of FIG. 3.

Similarly, the present disclosure provides a stop transaction sequence to preserve the stop transaction function of the omitted chip select pin. This process 600 is illustrated in FIG. 6. The process 600 starts with the host chip 302 determining that an end of the transaction has occurred and detects the last MISO state (block 602). Note that the detection of the last MISO state is relevant to block 406 described above. The host chip 302 then holds the clock signal at a logical high (block 604). The device chip 304 samples the clock signal for a predetermined number of clock cycles of the internal clock 320 to detect and confirm the change to the logical high (block 606). The device chip 304 sends a stop ACK by inverting the MISO line (block 608). The host chip 302 receives the stop ACK and deasserts the clock signal (block 610). The device chip 304 samples the clock for a predetermined number of clock cycles of the internal clock 320 to detect and confirm the logical low of the clock signal (block 612) and sends a second stop ACK by inverting the MISO line back to its original "last state"

and enters an idle state (block 614). The host chip 302 receives the second stop ACK and enters the idle state (block 616).

Figure 7:
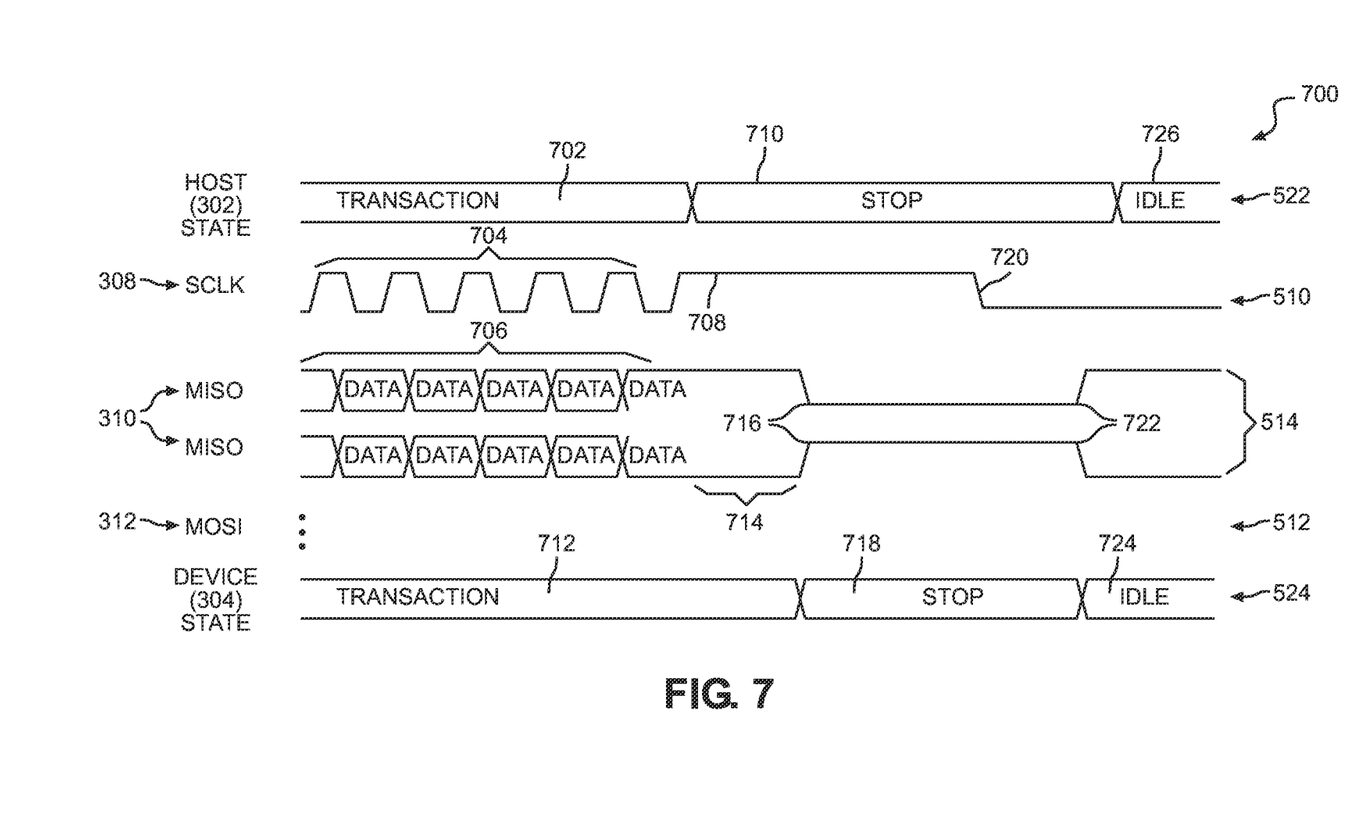
FIG. 7 is a signaling diagram showing the stop condition sequence of FIG. 6.

FIG. 7 provides a signaling diagram 700 of the stop sequence. The host chip 302 starts in a transaction state 702 with the clock signal active (704) on clock line 308 (shown by line 510). Likewise, data 706 is being sent on the MISO line 310 (indicated by line 514). The MOSI line 312 (indicated by line 512) is quiescent while the data 706 is being delivered. As the host chip 302 reaches the end of the transaction state 702, the host chip 302 drives the clock line 308 to a logical high 708 to enter a stop transaction state 710. The device chip 304, which was in a transaction state 712 initially holds the MISO line 310 at the last state (generally at 714) while the device chip 304 samples the clock line 308 at the clock pin 324A for a sufficient number of clock cycles from the internal clock 320 to determine and confirm the extended logical high and then inverts the MISO line 310 (generally at 716) to provide a stop ACK to the host chip 302 and enters a stop state 718. On receipt of the stop ACK, the host chip 302 drives the clock line 308 to a logical low at 720. The device chip 304 sends a second stop ACK by inverting the MISO line 310 again (generally at 722) and enters an idle state 724. On receipt of the second stop ACK, the host chip 302 also enters an idle state 726.

Figure 8:
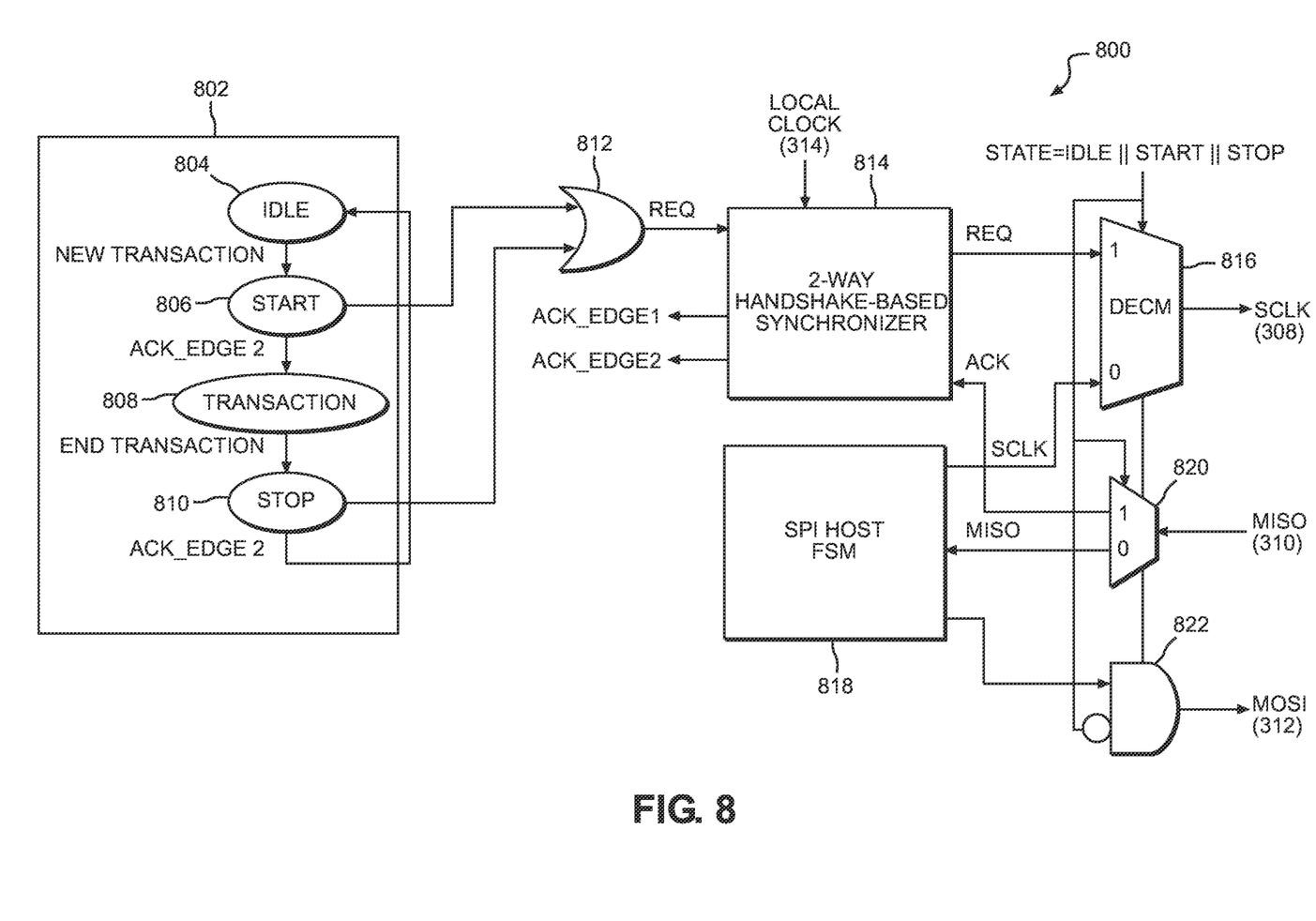
FIG. 8 is a block diagram of an exemplary circuit that implements the host or master chip of FIG. 3.
Figure 9:
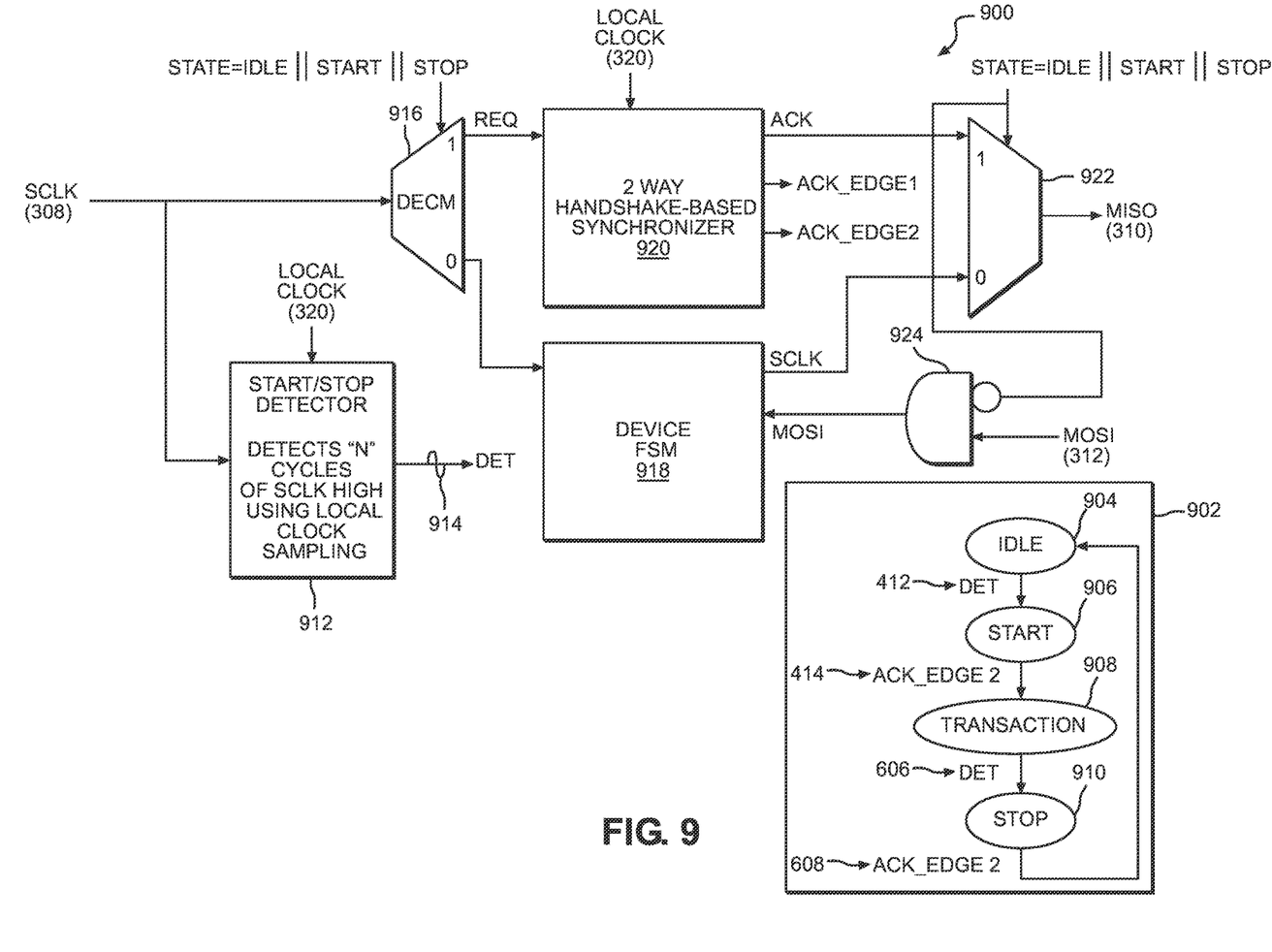
FIG. 9 is a block diagram of an exemplary circuit that implements the device or slave chip of FIG. 3.

While there are myriad ways that the bus interfaces 318, 324 and control circuits 316, 322 may be implemented, FIGS. 8 and 9 provide two illustrative block diagrams showing how they may be implemented in the host chip 302 and device chip 304, respectively. In this regard, FIG. 8 illustrates a circuit 800 for the host chip 302 and FIG. 9 illustrates a circuit 900 for the device chip 304.

With reference to FIG. 8, the circuit 800 may have a state machine 802 that transitions between an idle state 804, a start state 806, a transaction state 808 and a stop state 810. When the state machine 802 enters the start state 806, a signal is sent to an OR gate 812, which sends a request to a two-way handshake-based synchronizer circuit 814. The OR gate 812 also receives a signal when the state machine 802 enters the stop state 810. The synchronizer circuit 814 receives a clock signal from the clock 314 and generates a request signal to a multiplexer 816 that controls the signal on the clock line 308. The multiplexer 816 also receives a clock signal from a host finite state machine (FSM) 818. A multiplexer 820 is similarly coupled to the MISO line 310 and an AND gate 822 is coupled to the MOSI line 312. The signal from the MISO line 310 is provided to the host FSM 818 and the synchronizer circuit 814, which indicates that the various ACKs were received form the device chip 304.

With reference to FIG. 9, the circuit 900 may have a state machine 902 that transitions between an idle state 904, a start state 906, a transaction state 908, and a stop state 910. The clock signal from the clock line 308 is provided to a start/stop detector circuit 912 that uses the local clock 320 to test the clock signal for "N" cycles to determine if the clock signal is being held at a logical high or logical low. That is, if each sample in the N cycles of the local clock 320 is the same, the device chip 304 infers that the clock signal is being held at a level. The start/stop detector circuit 912 may then output a detected signal 914 to the state machine 902. The clock signal is also supplied to a multiplexer 916 that outputs a one or a zero depending on the state. The zero is output to a device FSM 918, while the one is output to a two-way handshake-based synchronizer circuit 920. The synchronizer circuit 920 also receives a signal from the local clock 320 and outputs an ACK to a multiplexer 922 as well as ACK_Edge1 and ACK_Edge2 signals. The device FSM 918 is also coupled to the multiplexer 922 to control the MISO line 310. The MOSI line 312 is coupled to an AND gate 924, which provides a signal to the device FSM 918.

The systems and methods for chip operation using serial peripheral interface (SPI) without a chip select pin according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 10:
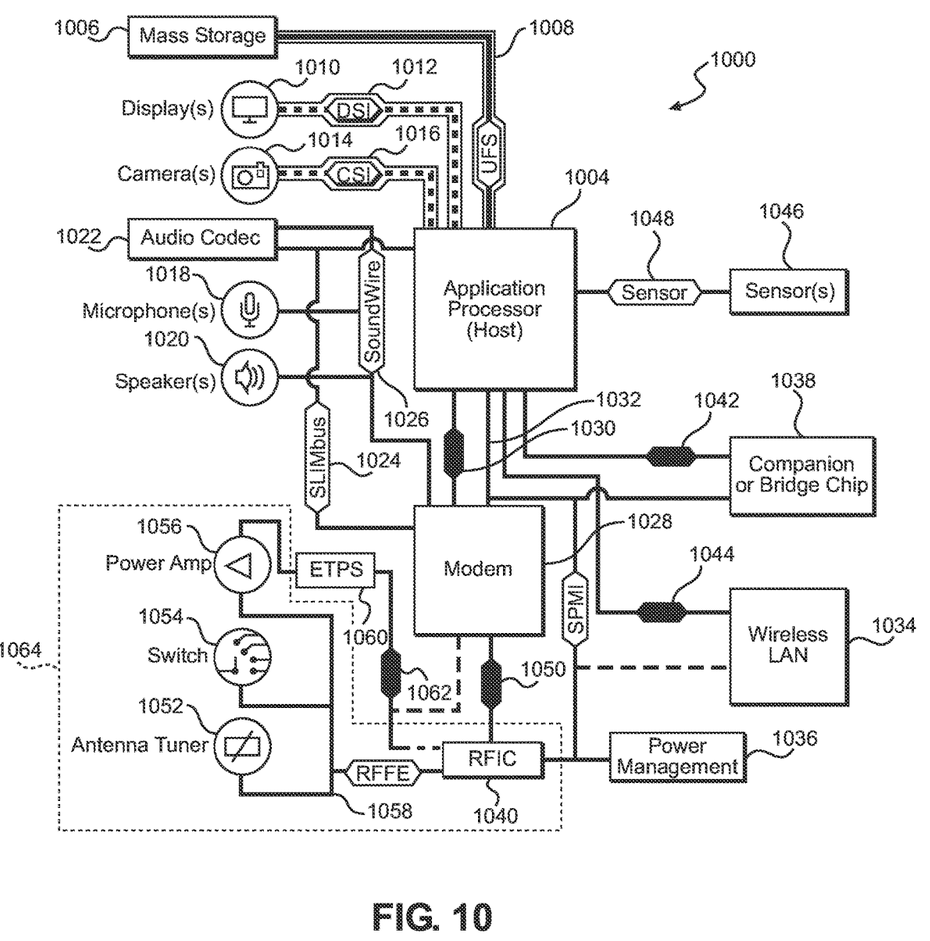
FIG. 10 is a block diagram of an exemplary mobile computing device that can include the chip-to-chip system of FIG. 3.

In this regard, FIG. 10 is a system-level block diagram of an exemplary mobile terminal 1000 such as a smart phone, mobile computing device tablet, or the like. While a mobile terminal s is particularly contemplated as being capable of benefiting from exemplary aspects of the present disclosure, it should be appreciated that the present disclosure is not so limited and may be useful in any system having an SPI bus.

With continued reference to FIG. 10, the mobile terminal 1000 includes an application processor 1004 (sometimes referred to as a host) that communicates with a mass storage element 1006 through a universal flash storage (UFS) bus 1008. The application processor 1004 may further be connected to a display 1010 through a display serial interface (DSI) bus 1012 and a camera 1014 through a camera serial interface (CSI) bus 1016. Various audio elements such as a microphone 1018, a speaker 1020, and an audio codec 1022 may be coupled to the application processor 1004 through a serial low-power interchip multimedia bus (SLIMbus) 1024. Additionally, the audio elements may communicate with each other through a SOUNDWIRE bus 1026. A modem 1028 may also be coupled to the SLIMbus 1024 and/or the SOUNDWIRE bus 1026. The modem 1028 may further be connected to the application processor 1004 through a peripheral component interconnect (PCI) or PCI express (PCIe) bus 1030 and/or a system power management interface (SPMI) bus 1032.

With continued reference to FIG. 10, the SPMI bus 1032 may also be coupled to a local area network (LAN or WLAN) IC (LAN IC or WLAN IC) 1034, a power management integrated circuit (PMIC) 1036, a companion IC (sometimes referred to as a bridge chip) 1038, and a radio frequency IC (RFIC) 1040. It should be appreciated that separate PCI buses 1042 and 1044 may also couple the application processor 1004 to the companion IC 1038 and the WLAN IC 1034. The application processor 1004 may further be connected to sensors 1046 through a sensor bus 1048, which may be an SPI bus. The modem 1028 and the RFIC 1040 may communicate using a bus 1050.

With continued reference to FIG. 10, the RFIC 1040 may couple to one or more RFFE elements, such as an antenna tuner 1052, a switch 1054, and a power amplifier 1056 through a radio frequency front end (RFFE) bus 1058. Additionally, the RFIC 1040 may couple to an envelope tracking power supply (ETPS) 1060 through a bus 1062, and the ETPS 1060 may communicate with the power amplifier 1056. Collectively, the RFFE elements, including the RFIC 1040, may be considered an RFFE system 1064. It should be appreciated that the RFFE bus 1058 may be formed from a clock line and a data line (not illustrated).

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. An integrated circuit (IC) comprising:
   a bus interface comprising:
      a clock pin configured to couple to a clock line on an associated bus;
      an input pin configured to couple to an input line on the associated bus; and
      an output pin configured to couple to an output line on the associated bus; and
   a control circuit configured to:
   detect a change on the clock pin;
   send an acknowledgment (ACK) on the output pin that the change was detected;
   after sending the ACK, detect a subsequent change on the clock pin; and
   send a second ACK on the output pin.
2. The IC of clause 1, wherein the bus interface comprises a serial peripheral interface (SPI) bus interface.
3. The IC of clause 2, wherein the bus interface does not include a chip select pin.
4. The IC of clauses 2 or 3, wherein the input pin comprises a master out, slave in (MOSI) pin and the clock pin comprises an SCLK pin.
5. The IC of clauses 2 to 4, wherein the output pin comprises a master in, slave out (MISO) pin.
6. The IC of any preceding clause, further comprising an internal clock coupled to the control circuit.
7. The IC of clause 6, wherein the control circuit is configured to detect the change on the clock pin by detecting a transition from a logical high to a logical low on the clock pin that lasts a predetermined number of clock cycles of the internal clock.
8. The IC of clause 6, wherein the control circuit is configured to detect the subsequent change on the clock pin by detecting a transition from a logical low to a logical high on the clock pin that lasts a predetermined number of clock cycles of the internal clock.
9. The IC of clauses 6 to 8, wherein the control circuit is configured to send the ACK by inverting a logic level to a new logic level from an initial logic level on the output pin and holding the new logic level.
10. The IC of clause 9, wherein the control circuit is configured to send the second ACK by returning the output pin to the initial logic level and holding the initial logic level.

11. The IC of clause 9, wherein the control circuit is configured to determine the initial logic level based on a last state from a previous transaction.

12. The IC of any previous clause, wherein the control circuit is configured to detect a command on the input pin after sending the second ACK.

13. The IC of any previous clause, wherein the control circuit is further configured to detect a stop command by being configured to:
  detect that a clock signal on the clock line is being held at a logical high;
  send a first stop ACK on the output pin;
  detect that the clock signal has been changed to a logical low; and
  send a second stop ACK on the output pin.

14. An integrated circuit (IC) comprising:
  a bus interface comprising:
    a clock pin configured to couple to a clock line on an associated bus;
    an input pin configured to couple to an input line on the associated bus; and
    an output pin configured to couple to an output line on the associated bus; and
  a control circuit configured to:
    hold a clock signal on the clock pin at a logical high;
    change the clock signal to a logical low;
    receive an acknowledgment (ACK) on the input pin that the change was detected;
    after receiving the ACK, change the clock signal to the logical high; and
    receive a second ACK on the input pin.

15. The IC of clause 14, wherein the bus interface comprises a serial peripheral interface (SPI) bus interface.

16. The IC of clause 15, wherein the bus interface does not include a chip select pin.

17. The IC of clauses 15 or 16, wherein the output pin comprises a master out, slave in (MOSI) pin.

18. The IC of clauses 15 to 17, wherein the input pin comprises a master in, slave out (MISO) pin.

19. The IC of any of clauses 14 to 18, wherein the control circuit is configured to send a command on the output pin after receiving the second ACK.

20. The IC of any of clauses 14 to 19, wherein the control circuit is further configured to send a stop command by being configured to:
  hold the clock signal on the clock line at the logical high;
  receive a first stop ACK on the input pin;
  change the clock signal to the logical low; and
  receive a second stop ACK on the input pin.

21. A method for controlling a serial peripheral interface (SPI) bus, the method comprising:
  detecting a change on a clock pin;
  sending an acknowledgment (ACK) on an output pin that the change was detected;
  after sending the ACK, detecting a subsequent change on the clock pin; and
  sending a second ACK on the output pin.

22. The method of clause 21, further comprising:
  detecting that a clock signal on the clock pin is being held at a logical high;
  sending a first stop ACK on the output pin;
  detecting that the clock signal has been changed to a logical low; and
  sending a second stop ACK on the output pin.

23. A method for controlling a serial peripheral interface (SPI) bus, the method comprising:
  holding a clock signal on a clock pin at a logical high;
  changing the clock signal to a logical low;
  receiving an acknowledgment (ACK) on an input pin that the change was detected;
  after receiving the ACK, changing the clock signal to the logical high; and
  receiving a second ACK on the input pin.

24. The method of clause 23, further comprising:
  holding the clock signal on the clock pin at the logical high;
  receiving a first stop ACK on the input pin;
  changing the clock signal to the logical low; and
  receiving a second stop ACK on the input pin.

What is claimed is:

1. An integrated circuit (IC) comprising:
  a bus interface comprising:
    a clock pin configured to couple to a clock line on an associated bus;
    an input pin configured to couple to an input line on the associated bus; and
    an output pin configured to couple to an output line on the associated bus; and
  a control circuit configured to:
    detect a change on the clock pin;
    send an acknowledgment (ACK) on the output pin that the change was detected;
    after sending the ACK, detect a subsequent change on the clock pin; and
    send a second ACK on the output pin.

2. The IC of claim 1, wherein the bus interface comprises a serial peripheral interface (SPI) bus interface.

3. The IC of claim 2, wherein the bus interface does not include a chip select pin.

4. The IC of claim 2, wherein the input pin comprises a master out, slave in (MOSI) pin and the clock pin comprises an SCLK pin.

5. The IC of claim 2, wherein the output pin comprises a master in, slave out (MISO) pin.

6. The IC of claim 1, further comprising an internal clock coupled to the control circuit.

7. The IC of claim 6, wherein the control circuit is configured to detect the change on the clock pin by detecting a transition from a logical high to a logical low on the clock pin that lasts a predetermined number of clock cycles of the internal clock.

8. The IC of claim 6, wherein the control circuit is configured to detect the subsequent change on the clock pin by detecting a transition from a logical low to a logical high on the clock pin that lasts a predetermined number of clock cycles of the internal clock.

9. The IC of claim 6, wherein the control circuit is configured to send the ACK by inverting a logic level to a new logic level from an initial logic level on the output pin and holding the new logic level.

10. The IC of claim 9, wherein the control circuit is configured to send the second ACK by returning the output pin to the initial logic level and holding the initial logic level.

11. The IC of claim 9, wherein the control circuit is configured to determine the initial logic level based on a last state from a previous transaction.

12. The IC of claim 1, wherein the control circuit is configured to detect a command on the input pin after sending the second ACK.

13. The IC of claim 1, wherein the control circuit is further configured to detect a stop command by being configured to:
  detect that a clock signal on the clock line is being held at a logical high;
  send a first stop ACK on the output pin;

detect that the clock signal has been changed to a logical low; and send a second stop ACK on the output pin.

14. An integrated circuit (IC) comprising:
a bus interface comprising:
  a clock pin configured to couple to a clock line on an associated bus;
  an input pin configured to couple to an input line on the associated bus; and
  an output pin configured to couple to an output line on the associated bus; and
a control circuit configured to:
  hold a clock signal on the clock pin at a logical high;
  change the clock signal to a logical low;
  receive an acknowledgment (ACK) on the input pin that the change was detected;
  after receiving the ACK, change the clock signal to the logical high; and
  receive a second ACK on the input pin.

15. The IC of claim 14, wherein the bus interface comprises a serial peripheral interface (SPI) bus interface.

16. The IC of claim 15, wherein the bus interface does not include a chip select pin.

17. The IC of claim 15, wherein the output pin comprises a master out, slave in (MOSI) pin.

18. The IC of claim 15, wherein the input pin comprises a master in, slave out (MISO) pin.

19. The IC of claim 14, wherein the control circuit is configured to send a command on the output pin after receiving the second ACK.

20. The IC of claim 14, wherein the control circuit is further configured to send a stop command by being configured to:
hold the clock signal on the clock line at the logical high;
receive a first stop ACK on the input pin;
change the clock signal to the logical low; and
receive a second stop ACK on the input pin.

21. A method for controlling a serial peripheral interface (SPI) bus, the method comprising:
detecting a change on a clock pin;
sending an acknowledgment (ACK) on an output pin that the change was detected;
after sending the ACK, detecting a subsequent change on the clock pin; and
sending a second ACK on the output pin.

22. The method of claim 21, further comprising:
detecting that a clock signal on the clock pin is being held at a logical high;
sending a first stop ACK on the output pin;
detecting that the clock signal has been changed to a logical low; and
sending a second stop ACK on the output pin.

23. A method for controlling a serial peripheral interface (SPI) bus, the method comprising:
holding a clock signal on a clock pin at a logical high;
changing the clock signal to a logical low;
receiving an acknowledgment (ACK) on an input pin that the change was detected;
after receiving the ACK, changing the clock signal to the logical high; and
receiving a second ACK on the input pin.

24. The method of claim 23, further comprising:
holding the clock signal on the clock pin at the logical high;
receiving a first stop ACK on the input pin;
changing the clock signal to the logical low; and
receiving a second stop ACK on the input pin.

* * * * *

UNITED STATES PATENT AND TRADEMARK OFFICE
CERTIFICATE OF CORRECTION

| | |
|---|---|
| PATENT NO. | : 11,609,877 B1 |
| APPLICATION NO. | : 17/484419 |
| DATED | : March 21, 2023 |
| INVENTOR(S) | : Kishalay Haldar and Amit Gil |

It is certified that error appears in the above-identified patent and that said Letters Patent is hereby corrected as shown below:

On the Title Page

Item (12), change "Haidar et al." to --Haldar et al.--.

Item (72), change the name of the first inventor from "Kishalay Haidar" to --Kishalay Haldar--.

Signed and Sealed this
Twenty-first Day of November, 2023

Katherine Kelly Vidal
*Director of the United States Patent and Trademark Office*